(12) United States Patent
Mardmoeller et al.

(10) Patent No.: US 11,811,665 B2
(45) Date of Patent: Nov. 7, 2023

(54) TIME-SENSITIVE NETWORKING

(71) Applicant: RENESAS ELECTRONICS CORPORATION, Tokyo (JP)

(72) Inventors: Christian Mardmoeller, Duesseldorf (DE); Thorsten Hoffleit, Duesseldorf (DE)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/961,845

(22) PCT Filed: Jan. 24, 2018

(86) PCT No.: PCT/EP2018/051681
§ 371 (c)(1),
(2) Date: Jul. 13, 2020

(87) PCT Pub. No.: WO2019/145028
PCT Pub. Date: Aug. 1, 2019

(65) Prior Publication Data
US 2020/0389405 A1 Dec. 10, 2020

(51) Int. Cl.
*G06F 15/16* (2006.01)
*H04L 47/22* (2022.01)
*H04L 47/34* (2022.01)
*H04L 47/56* (2022.01)
*H04L 67/12* (2022.01)

(52) U.S. Cl.
CPC .............. *H04L 47/22* (2013.01); *H04L 47/34* (2013.01); *H04L 47/56* (2013.01); *H04L 67/12* (2013.01)

(58) Field of Classification Search
CPC ....... H04L 12/40143; H04L 2012/4026; H04L 47/22; H04L 47/34; H04L 47/56; H04L 47/622; H04L 67/12
See application file for complete search history.

(56) References Cited

U.S. PATENT DOCUMENTS

| 9,219,693 | B2 * | 12/2015 | Pannell | ................... H04L 47/10 |
| 10,218,628 | B2 * | 2/2019 | Bush | ..................... H04L 47/125 |
| 2015/0365337 | A1 * | 12/2015 | Pannell | ................ H04J 3/0697 370/503 |
| 2016/0191572 | A1 * | 6/2016 | Joy | ....................... H04L 12/413 370/402 |
| 2018/0302330 | A1 * | 10/2018 | Bush | ..................... H04L 47/28 |

(Continued)

OTHER PUBLICATIONS

Raagaard Michael Lander et al., "Runtime reconfiguration of time-sensitive networking (TSN) schedules for Fog Computing", 2017 IEEE Fog World Congress ( FWC) , IEEE, Oct. 30, 2017 (oCT. 30, 2017), pp. 1-6.

(Continued)

*Primary Examiner* — Normin Abedin
(74) *Attorney, Agent, or Firm* — McDermott Will & Emery LLP

(57) ABSTRACT

A network device comprising a set of queues and a time-aware shaper which comprises a set of transmission gates and gate control instructions. The gate control list comprises a set of individual gate control lists, each individual gate control list configured to control a respective gate and which comprises a sequence of entries, each entry comprising a duration of time.

24 Claims, 16 Drawing Sheets

(56) References Cited

U.S. PATENT DOCUMENTS

2018/0309656 A1* 10/2018 Regev ............... G06F 11/273
2020/0169972 A1* 5/2020 Marce ............... H04L 47/283

OTHER PUBLICATIONS

Brunner Stefan et al., "Automotive E/E-architecture enhancements by usage of ethernet TSN", 2017 13th Workshop on Intelligent Solutions in Embedded Systems (WISES), IEEE, Jun. 12, 2017 (Jun. 12, 2017), pp. 9-13.

Dorin Maxim et al., "Delay analysis of AVB traffic in time-sensitive networks (TSN)", Proceedings of the 25th International Conference on Real-Time Networks and Systems, RTNS '17, Jan. 1, 2017 (Jan. 1, 2017), pp. 18-27.

Wasiq Zia "Verification of Time Sensitive Networking Based Ethernet Enabled Automotive Communication Systems", Nov. 2, 2017 (Nov. 2, 2017), available at https://standards.ieee.org/content/dam/ieee-standards/standards/web/documents/presentations/d2-11_wasiq_verification_of_time_sensitive_networking_v2.pdf.

Kentis Angelos Mimidis et al., "Effects of port congestion in the gate control list scheduling of time sensitive networks", 2017 8th International Conference on the Network of the Future (NOF), IEEE, Nov. 22, 2017 (Nov. 22, 2017), pp. 138-140.

International Search Report issued in corresponding International Patent Application No. PCT/EP2018/051681, dated Oct. 26, 2018.

Transmittal of International Preliminary Report on Patentability and Written Opinion of the International Searching Authority for PCT/EP2018/051681, dated Jul. 28, 2020.

* cited by examiner

Fig. 12

TIME-SENSITIVE NETWORKING

CROSS REFERENCE TO RELATED APPLICATIONS

This application is the U.S. National Phase under 35 U.S.C. § 371 of International Application No. PCT/EP2018/051681, filed on Jan. 24, 2018, the entire contents are hereby incorporated by reference.

FIELD OF THE INVENTION

The present invention relates to a time-sensitive networking.

BACKGROUND

Time-sensitive networking (TSN) is a set of standards which define mechanisms for transmitting time-sensitive data over Ethernet networks. One of these standards, IEEE 802.1 Qbv-2015 entitled "Enhancements for Scheduled Traffic", specifies time-aware queue-draining procedures that enable nodes, such as bridges and end stations, to schedule transmission of frames based on IEEE 802.1AS timing, according to a common time in the whole network. Virtual Local Area Network (VLAN) priority values are used to enable simultaneous support of scheduled traffic, credit-based shaper (CBS) traffic and other bridged traffic over Local Area Networks (LANs). It defines a scheduling scheme involving reservation of time windows for different types of streams.

FIG. 1 schematically illustrates transmission selection using a time-aware shaper (TAS) defined in IEEE 802.1 Qbv-2015 for a set of eight queues having different traffic classes. The transmission gates (herein simply referred to as "gates") are used to control the transmission of frames in each traffic class: when a gate is open, frames in a traffic class can be transmitted and when the gate is closed, frames in that traffic class are blocked. The gates are controlled by a programmable common gate control list which specifies which traffic queue is permitted to transmit at a given point in time within a cycle.

FIG. 2 schematically illustrates a hardware implementation of an Ethernet controller which includes queues, gates controlled by a gate control list in accordance with IEEE 802.1 Qbv-2015, credit-based shaping logic and prioritised transmission selection logic. The gate control list and corresponding logic for controlling gate list execution can be implemented using registers and hardware logic.

As the gate control list becomes longer, significant computational effort is required to calculate the next gate-close event time. When an application employs unfavourable repetition periods, for example, many short overlapping gate open times, then this can result in very long lists.

FIG. 3 illustrates a very simple example of gate control involving three gates whose individual and collective repetition patterns are straightforward. Gate repetition is the time after which behaviour of a gate repeats. TAS cycle time is the smallest multiple of all gate individual repetition rates. Gate 0 is open for time t1, is closed for times t2 and t3, open for time t4, and closed for times t5 and t6. Gate 1 is closed for time t1, open for time t2, closed for times t3 and t4, open for time t5 and closed for time t6. Gate 3 open for times t1 and t2, open for time t3, closed during time t4 and open for times t5 and t6. As illustrated, the common gate control list has six entries.

FIG. 4 illustrates a more complicated (but still quite simple) example of gate control involving three gates. The example still involves the same number of gate-open and gate-close events as that shown in FIG. 3, but where the events are not aligned so well. In particular, there are overlaps between gates o and gate 1 being open and gates 1 and 2 being open. As illustrated, the common gate control list now has eleven entries.

These two simple examples help show how the common gate control list can become very long.

Moreover, even for well-aligned gate-open and gate-close events, such as that shown in FIG. 3, the lists can still become very long. For example, if a frame size is 1 ms and repetition time is either 1 ms and 20 ms, then this may require 40 entries in the table (i.e., 2×lowest common multiple of 1 and 20). If an application requires repetition rates with inconvenient periods, such as 1 ms, 8 ms, and 15 ms, then 240 entries may be required (i.e., 2×lowest common multiple of 1, 8 and 15).

There is also another aspect to time-aware shaping that can make gate control more complicated.

A time-aware shaper is defined such that a gate can only transmit a frame associated for its queue if there is sufficient time, i.e., time between a gate-start event and a gate-end event. This imposes a requirement for the gate to know the timing of the gate-end event to calculate whether is sufficient time available to transmit the entirety of the frame before the next gate-close event. The common gate control list is not particularly suited to achieve this.

While software-based control can accommodate complex cycles, and calculate gate open times, it is more difficult and expensive to realise in hardware (i.e., using registers and fixed logic). Therefore, when there is a large spread of gate-open event and gate-close event times, distributed across many entries, there is a need to determine an accumulated time for consecutive list entries with same gate-open and gate-close event times. This requires more logic and/or, if the list is stored RAM, time consuming to compute. One solution is to limit the minimum slot size to the maximum size of frame, but this is unacceptable in many applications.

Ideally, a hardware-implemented time-aware shaper should be able to handle many patterns of gate-open and gate-close events as possible involving a wide range of overlaps and so allow the time-aware shaper to be used in as many applications as possible without application-specific modification or adaptation.

SUMMARY

According to a first aspect of the present invention there is provided a network device for time-sensitive networking comprising a set of queues and a time-aware shaper which comprises a set of transmission gates and gate control instructions. The gate control instructions comprise a set of individual gate control lists, each individual gate control list configured to control a respective gate and which comprises a sequence of entries, each entry comprising a duration of time.

Using individual gate control lists (as opposed to a common gate control list) can make open time calculation easier, simplify gate control and can reduce the number of entries.

Each entry in the sequence of entries may include at least one control field. A first entry in the sequence of entries may include a control field which specifies gate state. An entry in the sequence of entries may include a control field which indicates end of list. A registry may be provided with includes the number of entries (or "length of list").

The network device may further comprise configuration data associated with each individual gate control list. The individual gate control list and the configuration data may be stored in the same location, for example, a special function register or memory.

The network device may further comprise a set of gate controllers, each gate controller configured to read an individual gate control list, to generate a gate control signal and to issue the gate control signal to a respective gate.

Each gate controller may be configured to determine an initial state of a respective gate and, thereafter, to read an entry in the gate control list and to toggle the state of the gate in response to reading the entry without the entry specifying the state of the gate. Each gate controller maybe configured, in a first cycle, to read each entry in the sequence of entries starting from an initial entry and, in a second, subsequent cycle, to ready entries in the sequence starting from an entry which follows the initial entry. Toggling, i.e., switching between open and close states with every entry, can help to simply gate control.

The network device may further comprise a data handler for allocating data to the set of queues. The network device may further comprise a media access controller. The network device may further comprise transmission selection logic.

The network device is preferably an Ethernet controller. The network device is preferably implemented in hardware.

According to a second aspect of the present invention there is provided a monolithic integrated circuit comprising the network device.

The monolithic integrated circuit may further comprise at least one central processing unit. The monolithic integrated circuit may be a microcontroller or a system-on-a-chip (SoC). The network device may be a peripheral module of a microcontroller or SoC. The monolithic integrated circuit may further comprise random-access memory. The monolithic integrated circuit may further comprise a routing engine and so provide, for example, a bridge (or "switch"). The monolithic integrated circuit may further comprise a physical layer transceiver (i.e., PHY). The monolithic integrated circuit may further comprise an interface to an external (i.e., off-chip) physical layer transceiver. The transceiver may comprise a media-independent interface (MII) module.

According to a third aspect of the present invention there is provided an end station comprising the network device of the first aspect of the invention or the monolithic integrated circuit of second aspect of the invention.

According to a fourth aspect of the present invention there is provided a switch or bridge comprising the network device of the first aspect of the invention or the monolithic integrated circuit of second aspect of the invention.

According to a fifth aspect of the present invention there is provided a network comprising a bus system and at least one network device of the first aspect of the invention, at least one monolithic integrated circuit of the second aspect of the invention, at least one end station of the third aspect of the invention and/or at least one switch of the fourth aspect of the invention in wired communication with the bus system.

According to a sixth aspect of the present invention there is provided a motor vehicle comprising at least one network device of the first aspect of the invention, at least one monolithic integrated circuit of the second aspect of the invention, at least one end station of the third aspect of the invention and/or at least one switch of the fourth aspect of the invention.

The motor vehicle may be a motorcycle, an automobile (sometimes referred to as a "car"), a minibus, a bus, a truck or lorry. The motor vehicle may be powered by an internal combustion engine and/or one or more electric motors.

According to a seventh aspect of the present invention there is provided a system comprising at least one network device of the first aspect of the invention, at least one monolithic integrated circuit of the second aspect of the invention, at least one end station of the third aspect of the invention and/or at least one switch of the fourth aspect of the invention.

The system may be an industrial system, such as a plant. The plant may include one or more robots and/or controllers for the robots connected by a time-sensitive network.

According to an eighth aspect of the present invention there is provided a method of generating a gate control list. The method comprises receiving data describing operation of a set of gates (or "gate operation database"), converting the data into a set of individual gate control lists and writing the set of individual gate control lists into memory or set of registers. The gate control list can be generated dynamically or at compile time.

The method may further comprise, for each individual gate control list, determining if a gate is in the same state for first and last entries and, upon a positive determination, adding a time from the first entry to a time for the last entry.

According to a ninth aspect of the present invention there is provided a computer program which, when executed by a processor, causes the processor to perform the method of seventh aspect of the present invention.

According to a tenth aspect of the present invention there is provided a computer program product comprising a computer-readable medium (for example, a non-transitory computer readable medium) carrying or storing the computer program of the ninth aspect of the present invention.

According to eleventh aspect of the present invention there is provided a method of time-aware shaping. The method comprises reading an entry from an individual gate control list for a gate, generating a gate control signal and issuing the gate control signal to the gate.

The method is preferably a hardware-implemented method.

BRIEF DESCRIPTION OF THE DRAWINGS

Certain embodiments of the present invention will now be described, by way of example, with reference to FIGS. 5 to 15 of the accompanying drawings, in which:

FIG. 12 illustrates cycle start time;

DETAILED DESCRIPTION OF CERTAIN EMBODIMENTS

Figure 5:
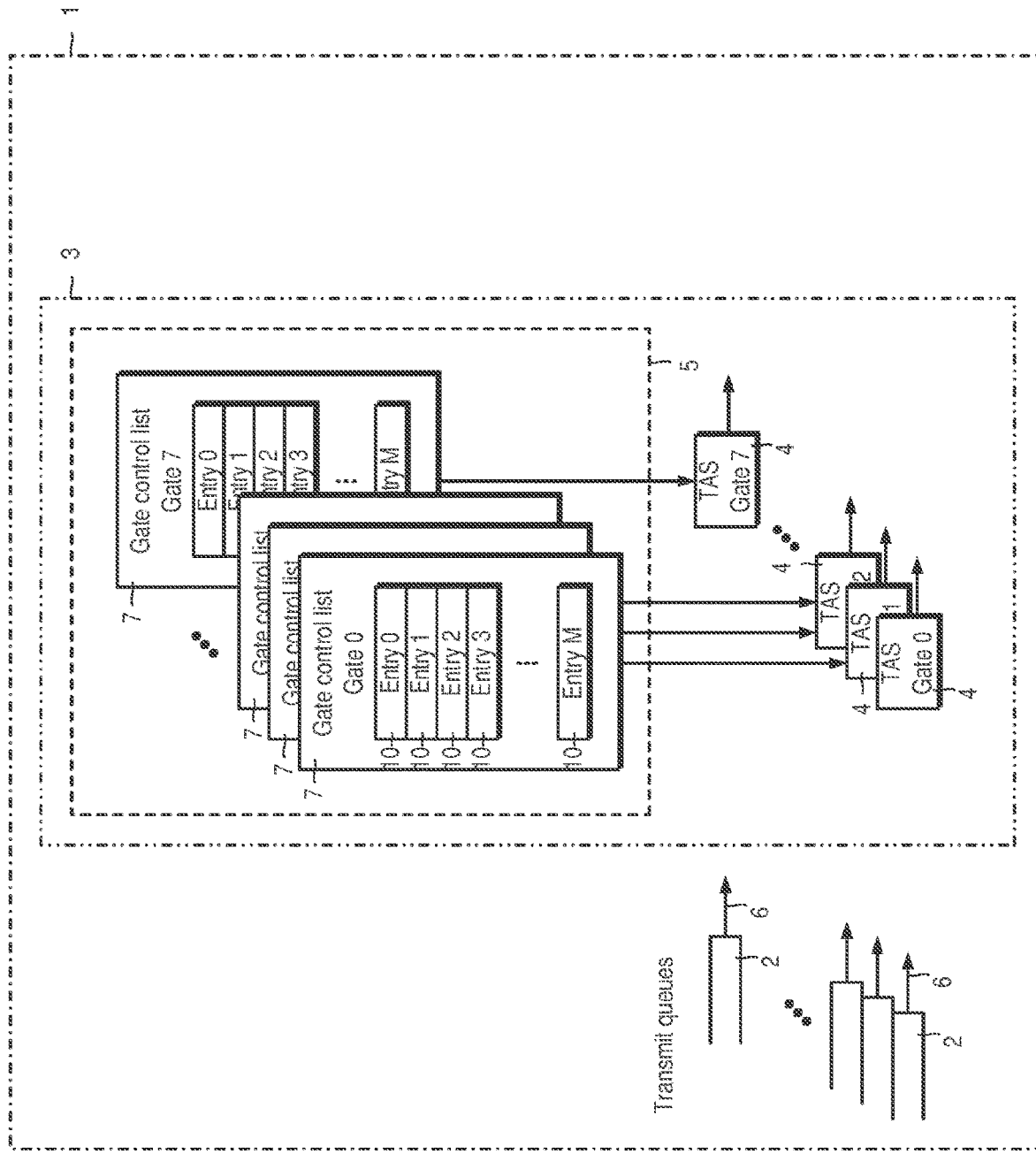
FIG. 5 illustrates a time-aware shaper including a set of individual gate control lists.

Referring to FIG. 5, a hardware-implemented network device 1 supporting time-sensitive networking (TSN) in accordance with IEEE 802.1 Qbv-2015 is shown. The device 1 is comprises a set of queues 2 and a time-aware shaper 3 which complies with IEEE 802.1 Qbv-2015. The time-aware shaper 3 includes, among other things, a set of transmission gates 4 and gate control instructions 5. The gate control instructions 5 control transmission of data frames 6 by the transmission gates 4. Thus, the time-aware shaper 3 allows transmission of data frames 6 from a queue 2 to be scheduled. IEEE 802.1 Qbv-2015 and other standards referred to therein are incorporated herein by reference.

Figure 11:
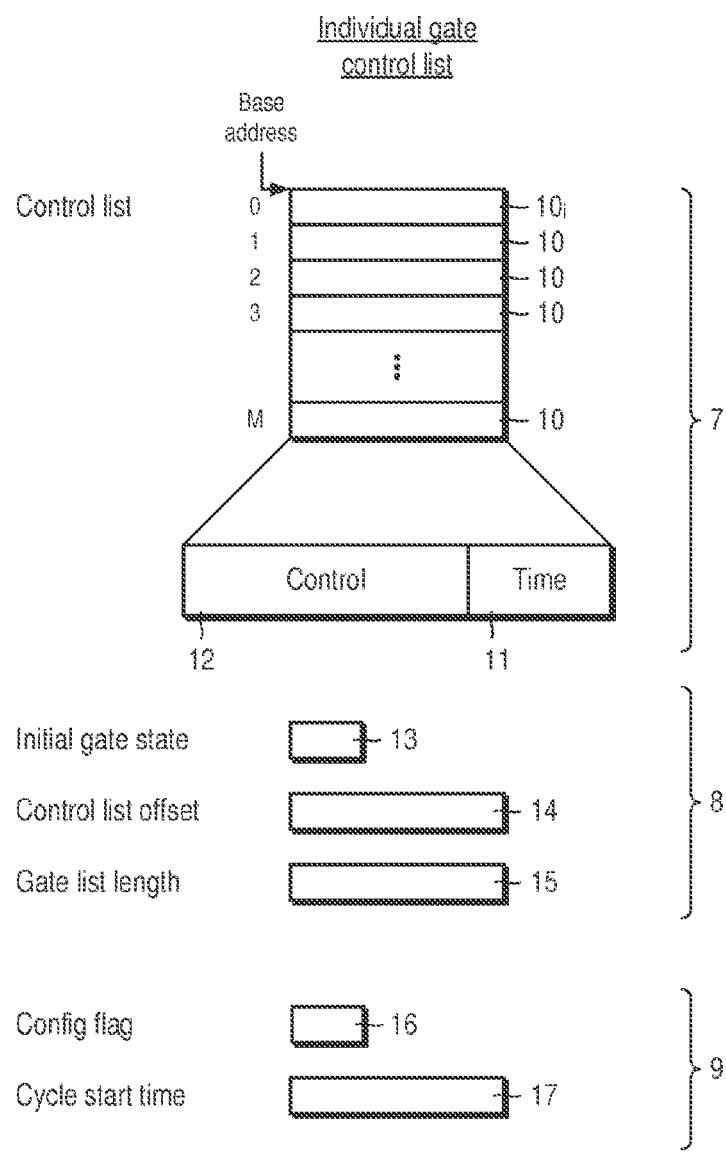
FIG. 11 illustrates special function registers used to implement an individual gate control list.

The gate control instructions 5 comprises a set of individual gate control lists 7 (or "queue gate lists" or "QGLs"), each individual gate control list 7 arranged to control a respective gate 4. Each individual gate control list 7 includes a series or sequence of one or more entries 10 which may specify an open time or close time 11 (FIG. 11). Here, each time 11 indicates the time (or "duration") for which a gate is open or closed. Each individual gate control list 7 can have a different number of entries 10. In other words, the individual gate control lists 7 do not need to have the same number of entries 10.

Each individual gate control list 7 can be small (for example, containing between 1 to 16 entries) since each list 7 need only handle repetition of one gate 4. Moreover, a set of individual gate control lists 7 can handle gates 4 whose open times are not well aligned, for example, involving overlapping open gate times, where the identity of the overlapping gates can vary throughout the cycle and the overlapping open gate times vary in duration. Furthermore, control using individual gate control lists 7 can be simpler and quicker than using a common gate control list since open and close times are predetermined and can be simply read out from each list 7, rather than being computed on-the-fly during operation.

Figure 1:
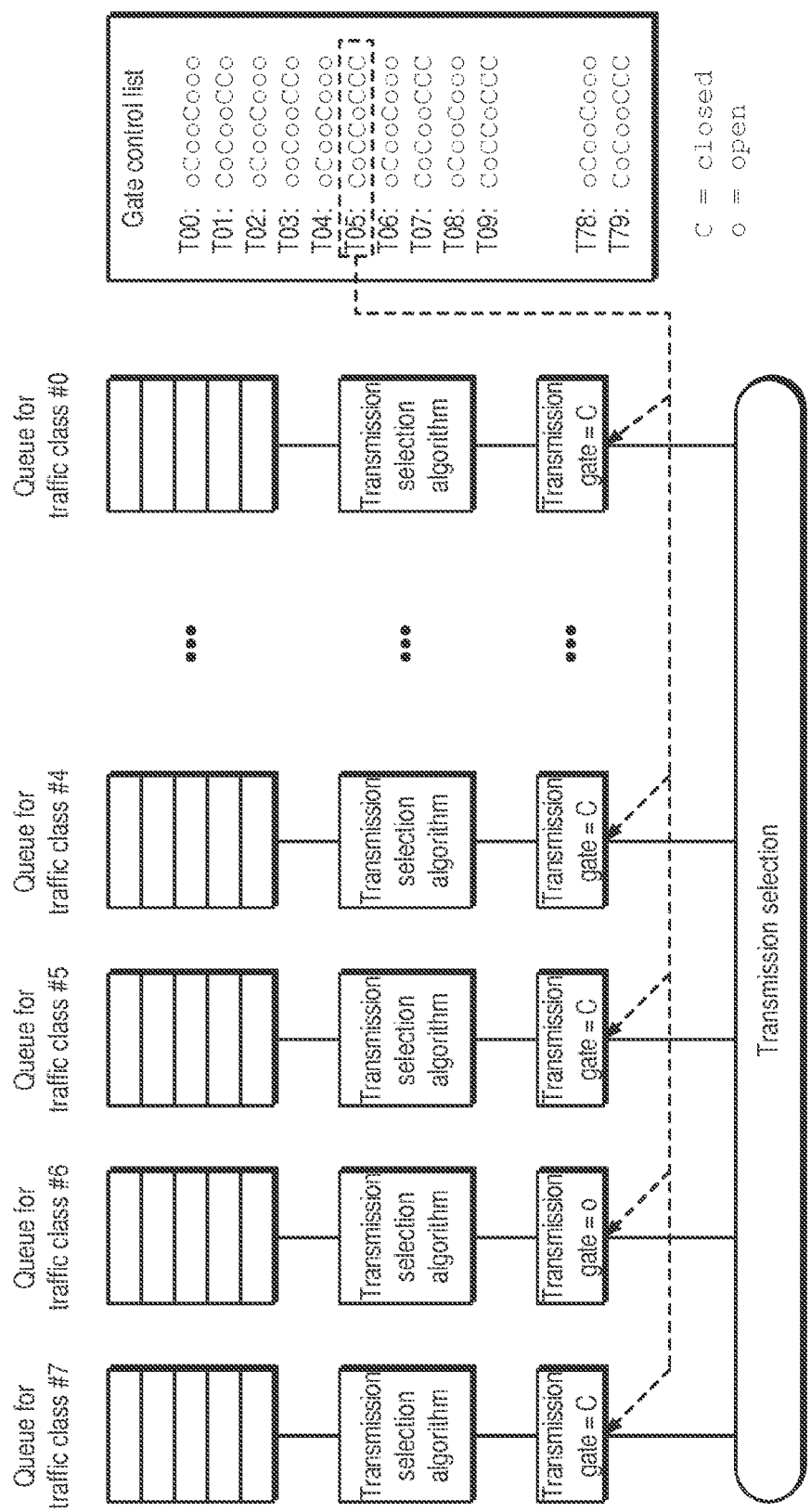
FIG. 1 schematically illustrates transmission selection using a time-aware shaper.
Figure 2:
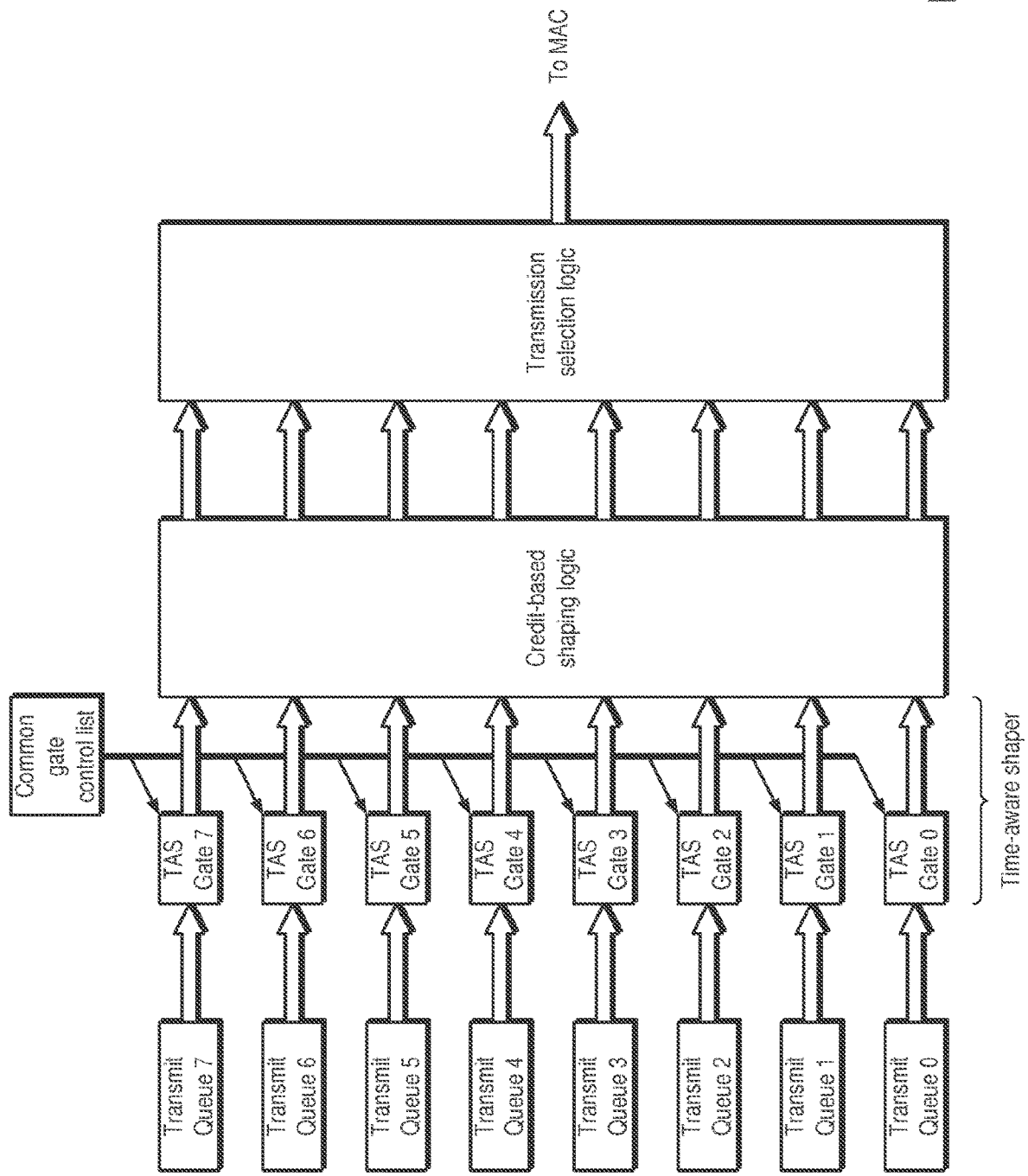
FIG. 2 is a schematic block diagram of a part of an Ethernet controller.
Figure 3:
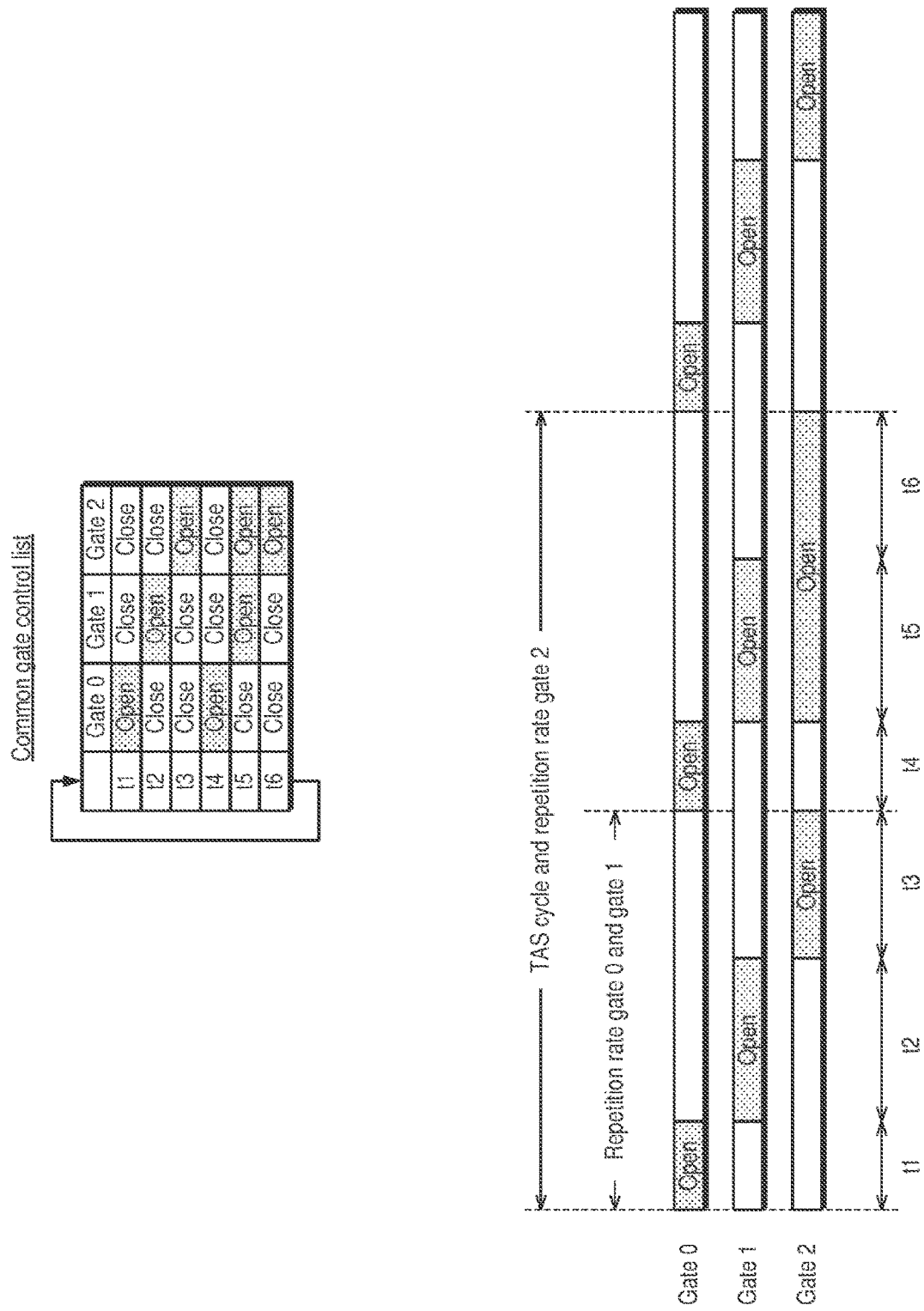
FIG. 3 illustrates a simple example of operation of three time-aware shaper gates and a corresponding common gate control list.
Figure 6:
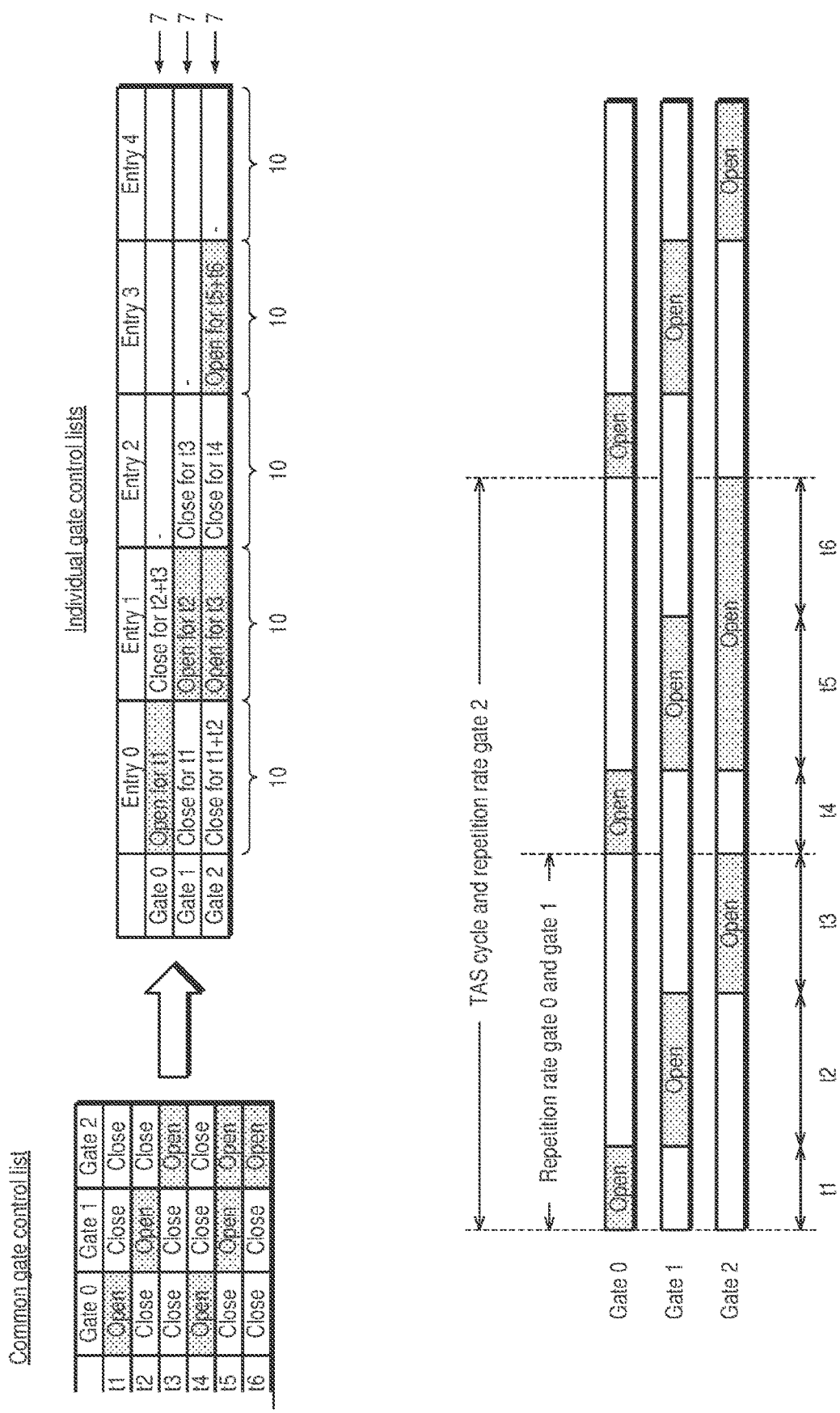
FIG. 6 illustrates comparison of a common gate control list and a set of individual gate control lists for a simple example of gate control.

Referring to FIG. 6, a simple example of time-aware shaper gate control is shown. This pattern of gate states is the same as that shown in FIG. 3.

FIG. 6 also shows a common gate control list for providing gate control and a set of three individual gate control lists 7 for achieving the same outcome as the common gate control list.

An individual gate control list 7 for gate 0 includes two entries 10, namely a first entry 10 indicating that the gate 0 should be open for time t1 and a second entry 10 indicating that the gate should be closed for time t2+t3. An individual gate control list 7 for gate 1 includes three entries 10, namely a first entry 10 indicating that the gate 1 should be closed for time t1 and a second entry 10 indicating that the gate should be open for time t2 and a third entry 10 indicating that the gate should be closed for time t3. An individual gate control list 7 for gate 2 includes four entries 10, namely a first entry 10 indicating that the gate 2 should be closed for time t1+t2 and a second entry 10 indicating that the gate should be open for time t3, a third entry 10 indicating that the gate should be closed for time t4 and a fourth entry 10 indicating that the gate should be open for time t5+t6.

Figure 4:
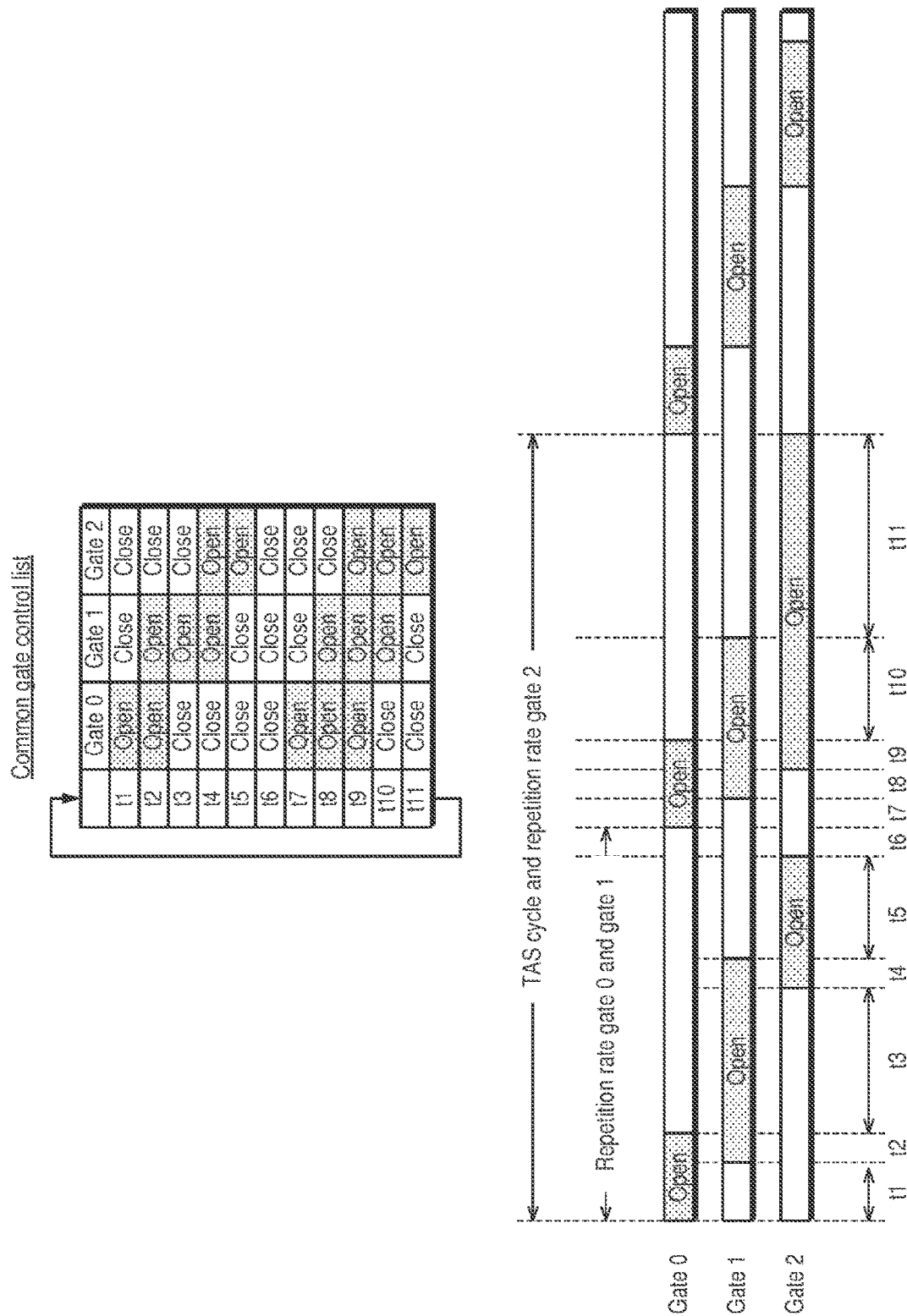
FIG. 4 shows a more complex example of operation of three time-aware shaper gates and a corresponding common gate control list.
Figure 7:
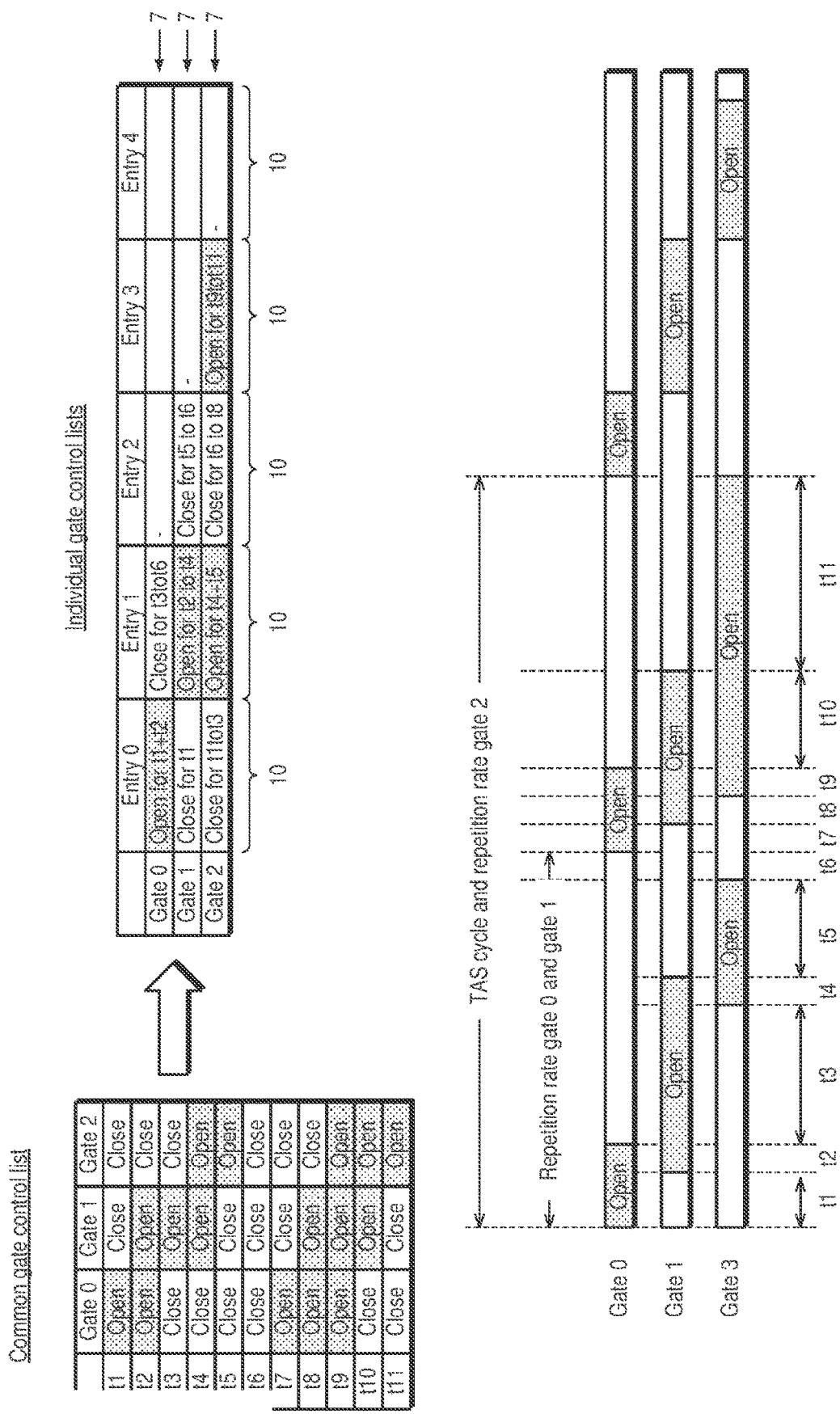
FIG. 7 illustrates comparison of a common gate control list and a set of individual gate control lists for a more complex example of gate control.

Referring to FIG. 7, a more complex example of time-aware shaper gate control is shown. This pattern of gate states is the same as that shown in FIG. 4.

FIG. 7 also shows a common gate control list for providing gate control and a set of three individual gate control lists 7 for achieving the same outcome as the common gate control list.

An individual gate control list 7 for gate 0 includes two entries 10, namely a first entry 10 indicating that the gate 0 should be open for time t1+t2 and a second entry 10 indicating that the gate should be closed for time t3+t4+t5+t6. An individual gate control list 7 for gate 1 includes three entries, namely a first entry 10 indicating that the gate 1 should be closed for time t1 and a second entry 10 indicating that the gate should be closed for time t2+t3+t4 and a third entry 10 indicating that the gate should be closed for time t5+t6. An individual gate control list 7 for gate 2 includes four entries 10, namely a first entry 10 indicating that the gate 2 should be closed for time t1+t2+t3, a second entry 10 indicating that the gate should be open for time t4+t5, a third entry 10 indicating that the gate should be closed for time t6+t7+t8 and a fourth entry 10 indicating that the gate should be open for time t9+t10+t11.

From the example shown in FIG. 7, it is clear that the individual gate control lists 7 together can control the gates using fewer entries 10 than a common gate control list.

Comparing the examples shown in FIGS. 6 and 7, it is also clear that a slight increase in complexity of the gate state pattern to include overlapping open gates does not increase the number of entries 10 in the individual gate control lists 7 or at least does not increase the number of entries 10 compared to a common gate control list.

The use of individual gate control lists 7 can take advantage of the fact that the state of the gate alternates (or "toggles") between open and closed states.

One approach to gate control is simply to go through an individual gate control list 7 and, having gone through the list, to start going through the list from the start of the list. However, if the first and last entries in a list are in same state, i.e., both open or both closed, then this can interfere with toggling. It can result in inversion of gate state and so requires hardware and/or software to check the states of the first and last entries and, if necessary, to prevent toggling after the last entry or take other appropriate action.

Figure 8:
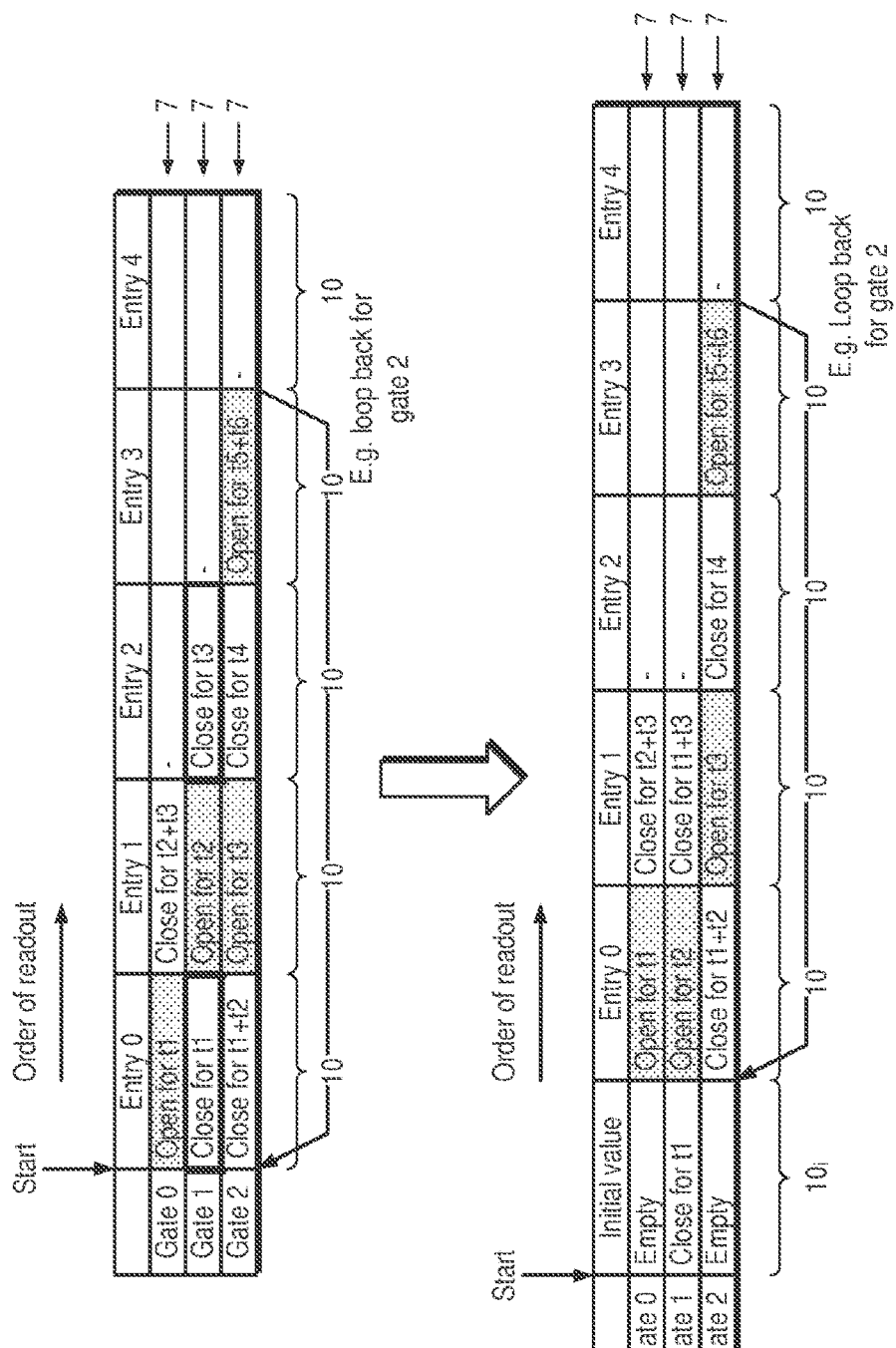
FIG. 8 illustrates adaptation of an individual gate control list.

Referring to FIG. 8, to address this, the individual gate control lists 7 can include an initial entry (or "one-time entry") $10_i$ which is read once when an individual gate control list 7 is read for the first time. Thus, in cases where the first and last entries might otherwise be in the same state, when preparing the list (before operation), the list 7 is adapted such that the first entry 10 becomes an initial entry io, and the duration of the last entry 10 is modified by adding the duration that was specified in the first entry 10.

For example, a first entry 10 indicates that gate 1 is open for t1 and a last entry 10 indicates that gate 1 is open for t3. The initial entry $10_i$ is set to indicate that gate 1 is closed for t1, then the following entries are shifted such that entry 1 becomes entry 0, entry 2 becomes entry 1 and the last entry 10 is modified by adding the time t1, i.e., to become t1+t3.

In cases where the first and last entries are in different states, no such adaptation of the list is is required.

Other algorithms for handling lists where the first and last entries are the same can be used. For example, it is possible to have an initial entry where the first and last entries are not same. For example, it is possible to append the first entry of the list to the end of list.

Figure 9:
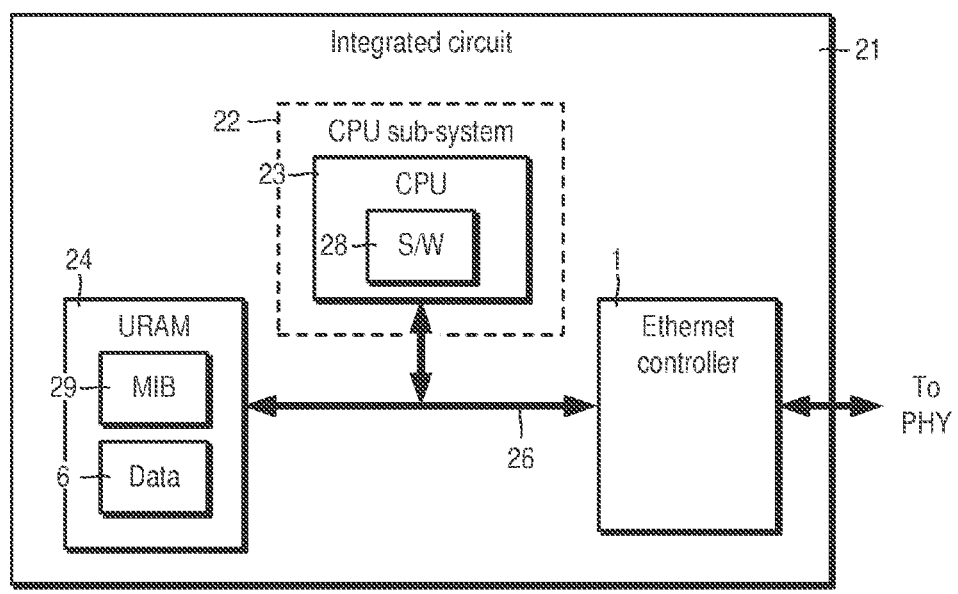
FIG. 9 is a schematic block diagram of an integrated circuit which supports time-sensitive networking.

Referring to FIG. 9, an integrated circuit 21 supporting time-sensitive networking (TSN) is shown. The integrated circuit 21 takes the form of a microcontroller, system-on-a-chip or other similar microprocessor-based system. However, the integrated circuit 21 need not include a microprocessor and may, for example, include an interface to a microprocessor (not shown) on a different chip (not shown).

The integrated circuit 21 includes a CPU sub-system 22 which includes at least one CPU 23, user RAM 24 (which may also be referred to as system RAM or simply RAM), and a TSN-compliant network device 1 in the form of an Ethernet controller interconnected by a bus system 26. The integrated circuit 21 may include a routing engine (not shown) for providing Ethernet switch functionality. The integrated circuit 21 may provide Ethernet end station functionality. The integrated circuit 21 may include other peripheral modules such as a timer, an interrupt controller and other types of communications controller. The integrated circuit 21 may also include physical layer (PHY) transceiver module(s) (not shown). In this case, however, external PHY transceiver IC (not shown) is used.

As will be explained in more detail hereinafter, a CPU 23 loads and executes application software 28 for transforming time-aware shaper control data 29 into individual gate control list data 7. The control data 29 takes the form of management information base (MIB) and is stored, for example, in the user RAM 24. The user RAM 24 may also store data 6, for example in the form of frames, for transmission by the Ethernet controller 1.

Figure 10:
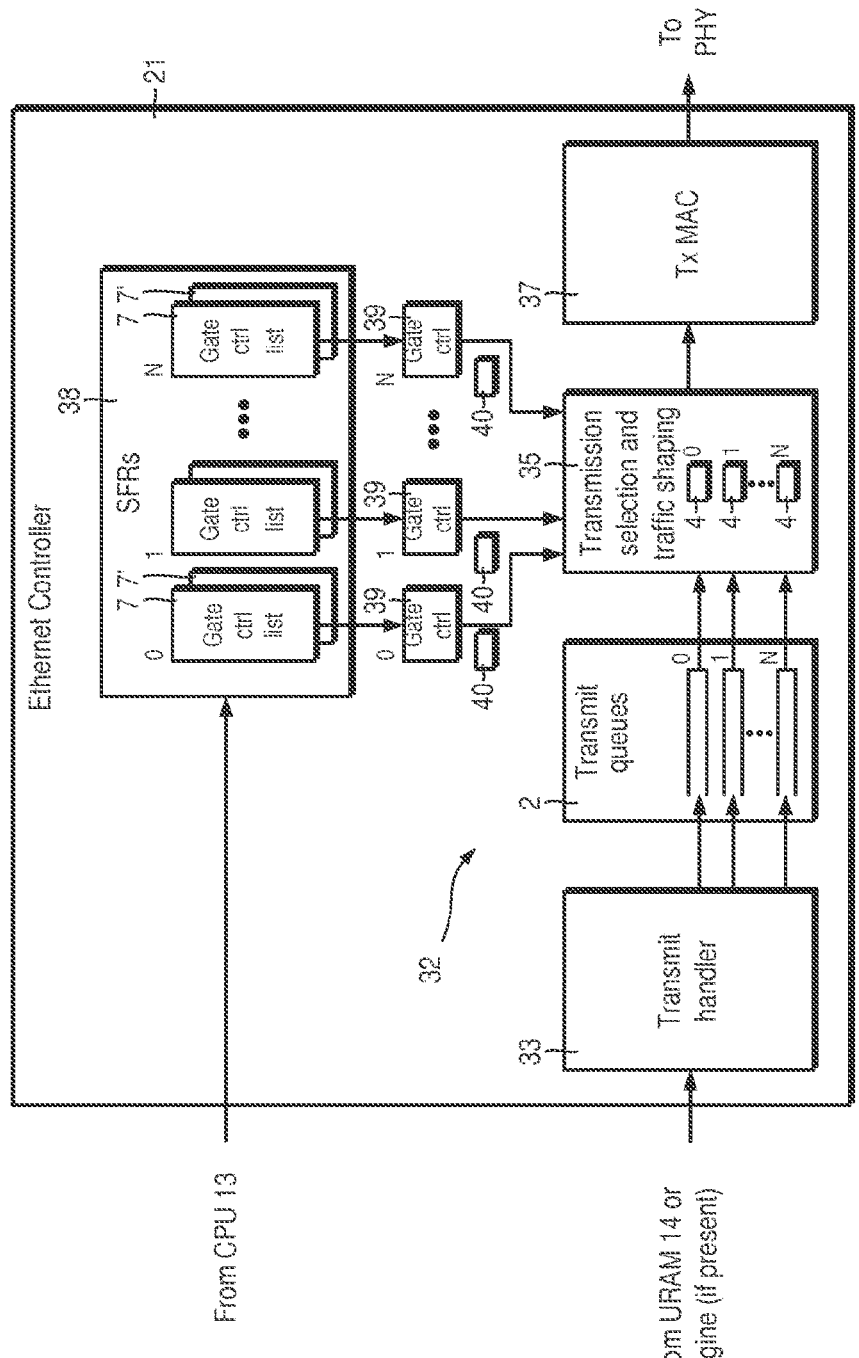
FIG. 10 is a schematic block diagram of an Ethernet controller comprising a time-aware shaper employing a set of individual gate control lists.

Referring also to FIG. 10, the TSN-compliant Ethernet controller 1 is shown in greater detail.

The Ethernet controller 1 includes a receive path (not shown) and a transmit path 32 which includes a transmit handler 33, a set of N transmit queues 2 (where N≥2, e.g., 8), is transmission selection and traffic shaping logic 35 which includes a set of N gates 4 and transmission media access controller (MAC) 37.

In the case of an end station, the transmit handler 33 fetches frames 6 from user RAM 24 or other memory or buffer which may receive the data from a source, such as a digital camera (not shown). In the case of a switch, the transmit handler 33 receives frames 6 from the routing engine (not shown).

The transmission selection and traffic shaping logic 35 may implement credit-based shaping (CBS), strict priority round robin (SRR), round robin (RR), and/or time-aware shaping (TAS).

Individual gate control lists 7 are stored either in special function register (SFRs) 38 or in RAM (not shown) in the Ethernet controller 1. A set of shadow individual gate control lists 7' and shadow configuration data (not shown) may be provided to enable dynamic TAS schedule reconfiguration. Different lists 7, 7' and configuration data can be written to and accessed using respective base addresses.

The Ethernet controller 1 also includes a set of gate controllers 39, each controller 39 arranged to read a respective individual gate control list 7 and issue a control signal 40 to a corresponding gate 4. The gate controllers 39 implement a set of state machines (not shown) including a cycle timer state machine (not shown), a list execute state machine (not shown) and a list configuration state machine (not shown) as specified in Clause 8.6.9 of IEEE 802.1 Qbv-2015.

The control signal 40 may be a time, for example, in microseconds. The control signal 40 may be a remaining time, for example, in microseconds, before the gate changes state, or before the gate opens or closes (in the case that the state is defined). The control signal 40 be expressed in terms of number of bytes before the gate changes state, or before the gate opens or closes.

Gate close time is used if the time aware shaper supports implicit guard band. This is hardware support to ensure that frames do not cross gate close time. In some cases, this can be monitored and controlled by application software.

Referring also to FIG. 11, an individual gate control list 7 and associated configuration data 8, 9 is shown. The configuration data 8, 9 can include configuration data 8 which is specific to a respective individual gate control list 7 and configuration data 9 which shared amongst the individual gate control list 7. A shadow individual gate control list 7' has the same structure. Likewise, a shadow configuration data (not shown) has the same structure.

The individual gate control list 7 includes M entries 10 (where M≥1), each entry comprising a gate time 11 and control data 12. The control data 12 can indicate a gate state, i.e., open or closed, and/or whether the entry is the end of the list (EOL). Closed and open may be represented by logical '0' and '1' respectively. End of list may be represented by '1'.

The individual gate control list 7 or the configuration data 8 may include a flag or field 13 indicating an initial start state i.e., open or closed.

The configuration data 8 may include a gate list offset 14 which can be used to access entry 1 (i.e., the first entry 10 after the initial entry io,), and an optional gate list length 15 (which may be omitted if the last entry is masked in control field 10 of list).

As part of shared configuration data 9, a flag 16 for signaling re-configuration, e.g. switching to an alternative list, i.e., to the shadow list 7' or vice versa for all queues and a cycle start time 17 can be specified. The switch to an alternative list can be triggered in hardware or by software.

Figure 12:
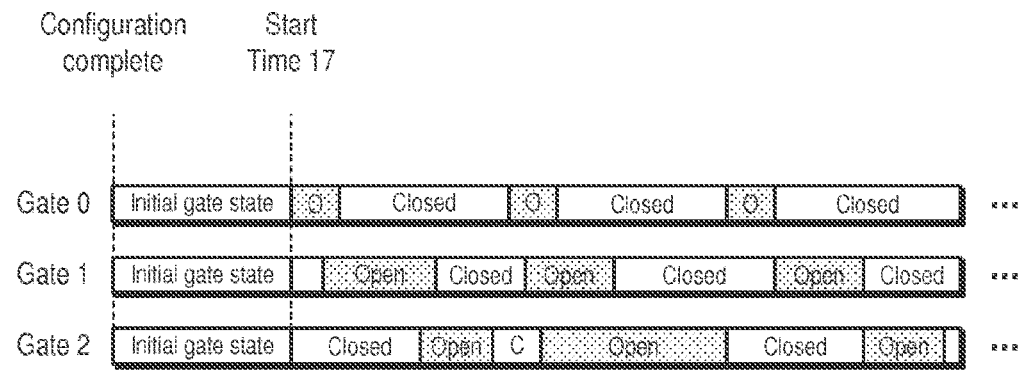

Referring to FIG. 12, the start time 17 is an absolute time at which a cycle of gate operations for a given list 7, 7' begins.

The cycle start time 17 is not directly defined in IEEE 802.1 Qbv-2015 ibid. The start time 17 is a pre-calculated number which may be calculated by software (i.e., by application software running on the CPU) and then written to hardware (i.e. to the cyrcle start time field 17 in the SFR 38). Clause 8.6.9.1.1 of IEEE 802.1Qbv-2015 specifies a CycleStartTime. Software can calculate the CycleStartTime and provide the result to hardware. However, the software may be too slow to provide the result in time and, thus, may end up providing a cycle start time in the past. Therefore, a margin allowing for a delay in software execution may be needed to avoid or prevent this from happening. Hardware can observe times in the past. However, the hardware can be limited such that it only accepts a cycle start time in a given window in the future (for example to a two-second window). In this case, software handles bigger offsets using a software timer (not shown).

Figure 14:
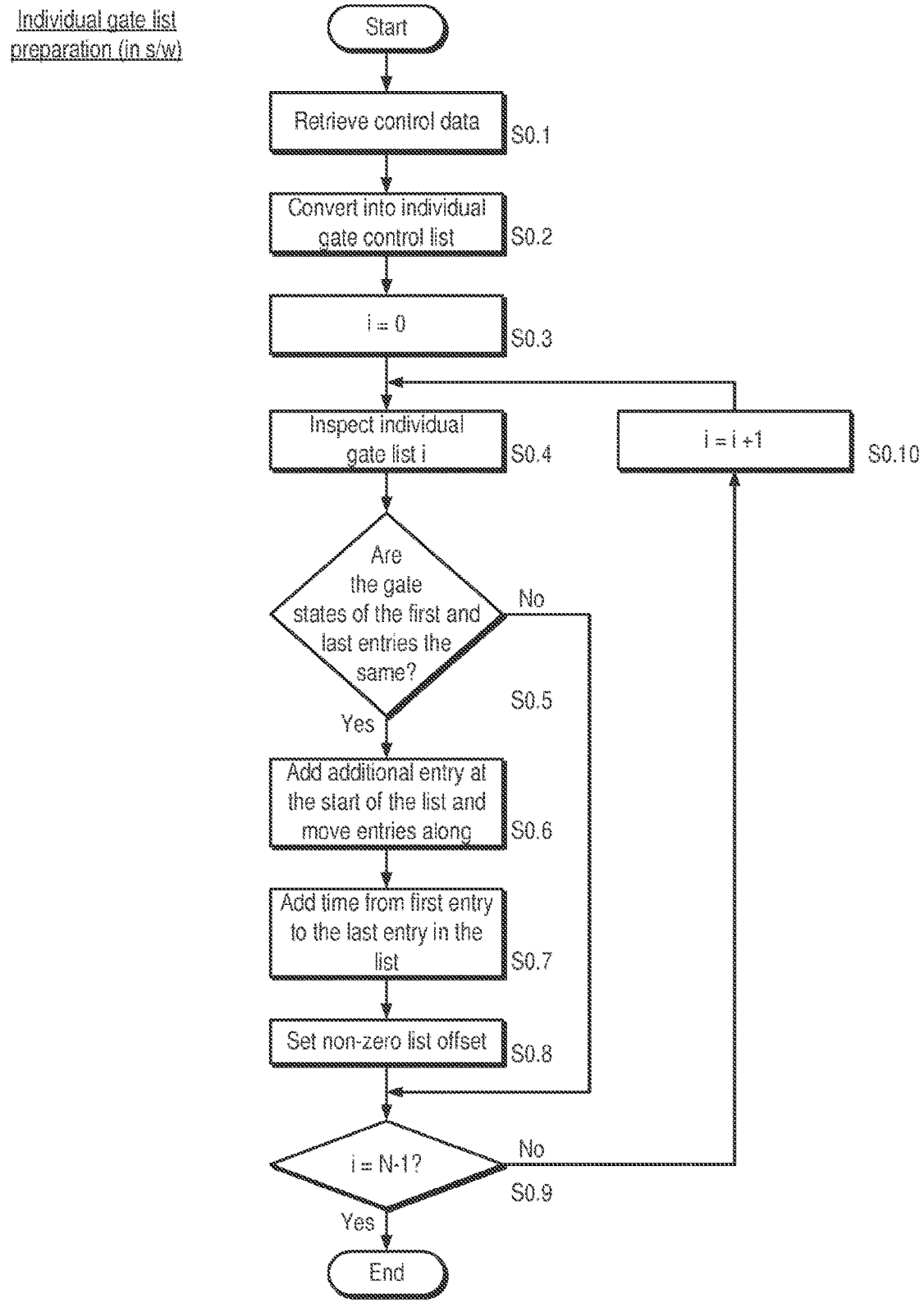
FIG. 14 is a process flow diagram of preparing individual gate control lists.
Figure 15:
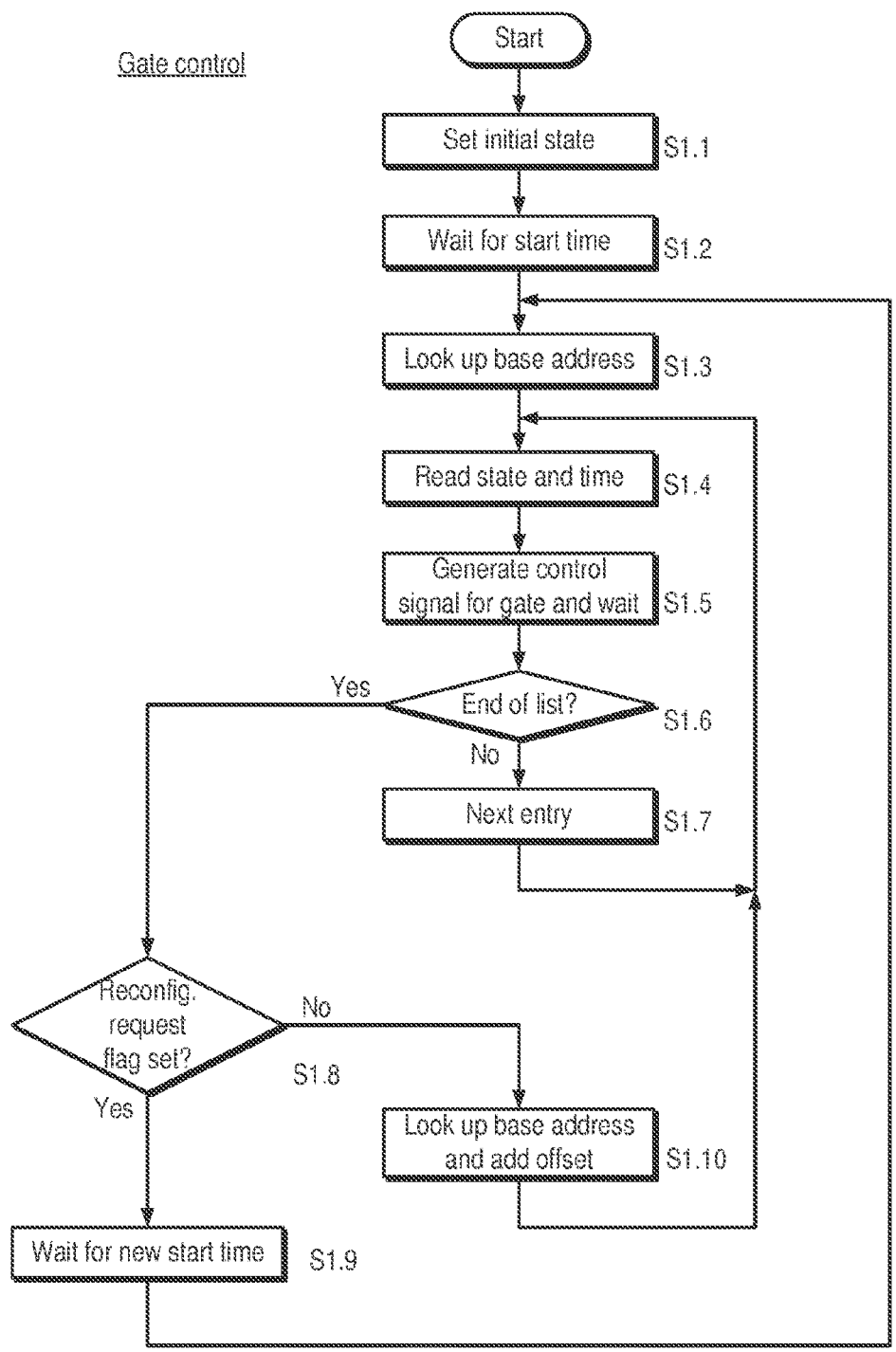
FIG. 15 is a process flow diagram of gate control.

The cycle start time 17 defines the start of a first cycle. The TAS cycle time is defined by the sum of the times in the common gate control list. Thus, the sum should equal OperCycleTime defined in IEEE 802.1 Qbv-2015. Thus, before converting a common gate control list in MIB 29 (FIG. 9) into individual gate control lists (step 0.2 in FIG. 14), the common gate control list may be shortened or lengthen to meet this requirement. For example, an entry in the common gate control list having a long period (say, 51 ms) may be discarded and replaced by one with a shorter period (say, 50 ms). However, the sum of the times in the common gate control list is likely to be equal to OperCycleTime and so this may not be required.

The reconfiguration flag 16 can be triggered by a timer (not shown) in hardware. The timer may set a time, for example, in the last slot of the common gate control list before the ConfigChangeTime (see clause 8.6.9.3.1).

A margin allowing for a delay in calculating a configuration change time may be included, similar to that used for the cycle start time.

Figure 13A:
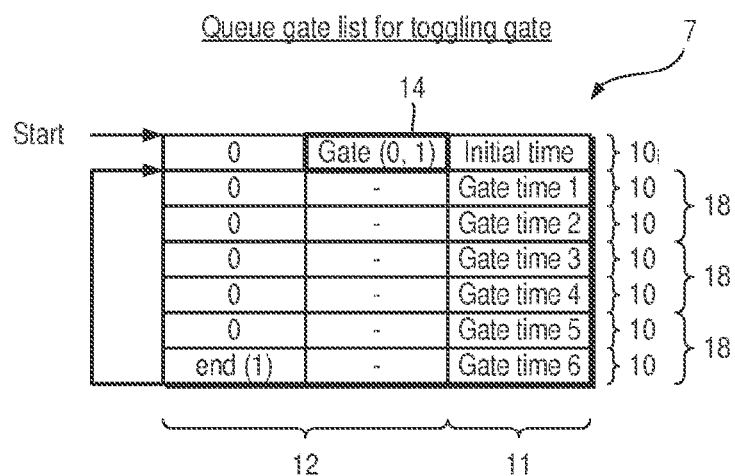
FIG. 13*a* illustrates an individual gate control list for a toggling gate.
Figure 13B:
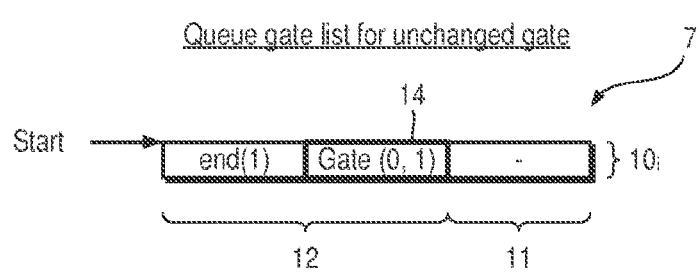
FIG. 13*b* illustrates an individual gate control list for a gate whose state does not change during a cycle.

Examples of individual gate control lists 7 are shown in FIGS. 13a and 13b.

FIG. 13a shows an individual gate control list 7 for a toggling gate.

An initial entry io, is found using the base address without applying the offset 14 (FIG. 11). The initial entry 10$_i$ defines an initial gate state and an initial time. After the initial entry 10$_i$, the entries 10 come in pairs 18. The end of the list 7 is signaled in the control data 12. The cycle starts again with a second entry 10.

FIG. 13b shows an individual gate control list 7 for a gate whose state does not change.

In this case, the initial entry io, is marked as the end of list. This is taken as indicating that the gate does not toggle and that its state does not change during a cycle.

Referring to FIGS. 9, 10, 11 and 14, the application software 28 reads the control data 29 (step S0.1) and transforms the control data 29 into a set of individual gate control lists 7 or a set of shadow gate individual control lists 7' (step S0.2 to S0.10). This can be performed before operations begin, i.e., before frame transmission begins. If shadow lists 7' are available, then writing of one set of gate control lists 7, 7', while the another set of gate control lists 7, 7' is being used. As explained earlier, the application software 28 inspects each gate individual control list 7 to determine if the first and last entries are in the same state (steps S0.4 & S0.5). If so, a new entry 8 is generated (step S0.6), time is added from the first entry to the last entry (step S0.7) and a non-zero offset 14 is set (step S0.8).

Referring to FIGS. 9, 10, 11 and 15, during operation in toggle mode, the gate controller 39 sets an initial state (step S1.1) and waits until the start time (step S1.2). The gate controller 39 goes through the list of entries 10 starting from the initial entry. If there is a gate state transition, then the gate controller 39 reads out the state and gate time (step S1.4), generates a control signal and waits the specified time (step S1.5). The gate controller 39 goes through the list of entries 8 (step S1.4 to S1.7) reading the time (step S1.4) and generating a control signal for the gate (step S1.5) until it reaches the end of the list (step S1.6). At the end of list, the gate controller 39 checks the configuration change flag 16 (step S1.8). If the flag 16 is set, then the process of gate control ends and the controller 39 waits for a new start time (step S1.9). If the flag 16 is not set, then the controller 39 starts the cycle again either at the initial entry 10, or at the next entry 10, depending on the offset 14 (step S110).

The reconfiguration flag is requested in a way that reconfiguration becomes active at the end of a TAS cycle of the common gate control list. The request can be triggered either by software or by hardware based on a 'reconfiguration time' or 'last cycle time'.

The 'new cycle start' time defines when the TAS schedule re-starts with a new configuration. The configuration state machine (not shown) switches between active and shadow configuration. It is possible to make reuse of the SFR of the 'Cycle start time' configuration.

Time-aware shapers can be used in a variety of time-sensitive networking, such as audio/video streaming and real-time control in automotive or industrial control applications.

Figure 16:
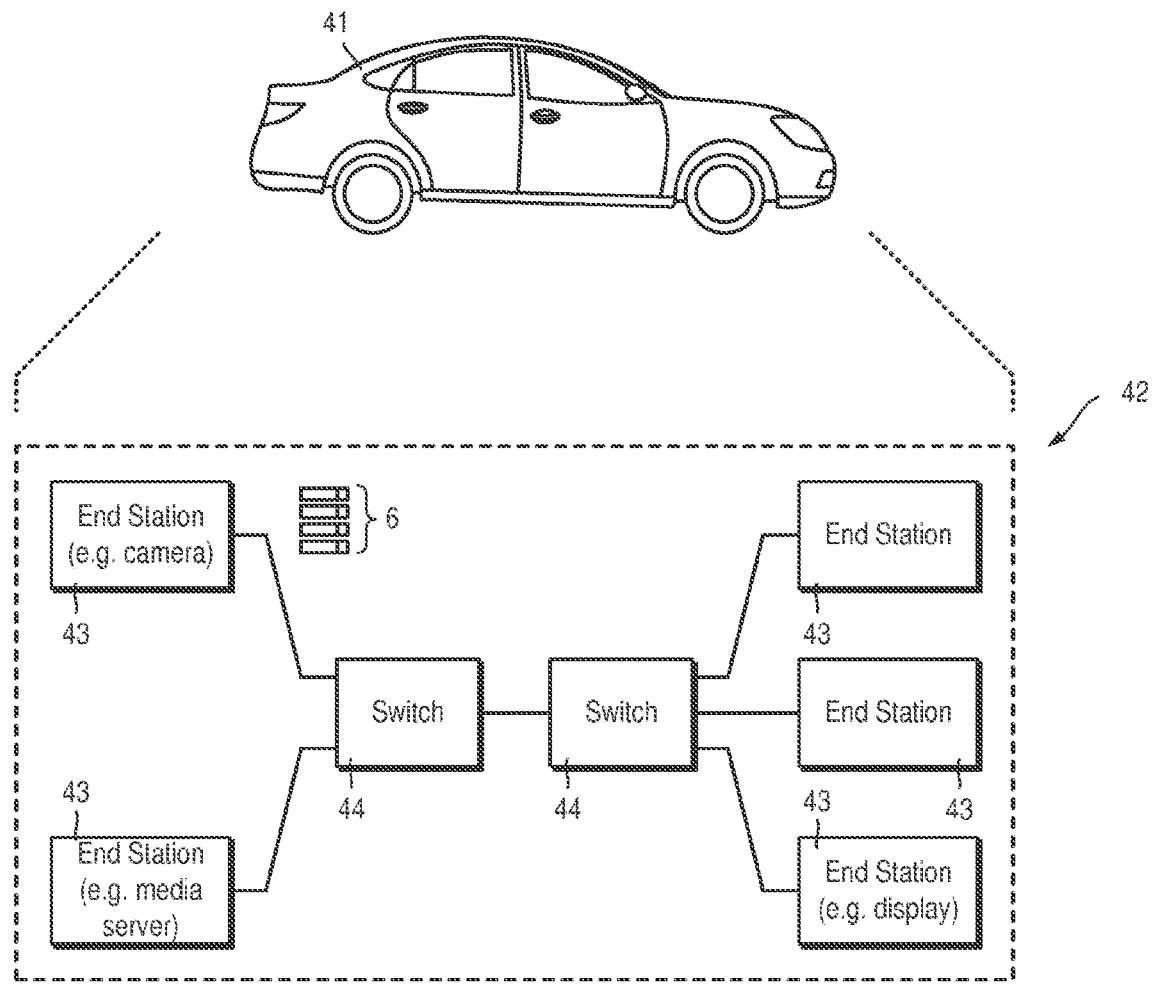
FIG. 16 illustrates a motor vehicle which comprises an Ethernet network which includes bridges and end stations which comprising respective Ethernet interfaces comprising a time-aware shaper employing a set of individual gate control lists.

Referring to FIG. 16, a motor vehicle 41 is shown in which a time-sensitive network 42 is deployed. The network 42 comprises a plurality of end stations 43 and bridges 44 interconnecting the end stations 43. One or more of the end stations 43 and bridges 44 may perform transmission of data 45 using a time-aware shaper as defined in IEEE 802.1 Qbv using individual control gate lists as herein described.

Modifications

It will be appreciated that various modifications may be made to the embodiments hereinbefore described. Such modifications may involve equivalent and other features which are already known in the design, manufacture and use of time-sensitive networking systems and component parts thereof and which may be used instead of or in addition to features already described herein. Features of one embodiment may be replaced or supplemented by features of another embodiment.

Toggling need not be used. Instead, each individual gate control list 7 may explicitly specify a gate state (i.e., open or closed) and a time.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A network device for time-sensitive networking comprising:
    a set of queues; and
    a time-aware shaper which comprises:
        a set of two or more gates; and
        gate control instructions;
    wherein the gate control instructions comprises:

a set of two or more gate control lists, each gate control list configured to control a respective single gate;
each gate control list comprising a sequence of two or more entries for the respective single gate; each entry comprising:
a gate state specifying whether the single respective gate is open or closed; and
a duration of time for which the gate state is active; and
a set of two or more gate controllers, each gate controller corresponding to a respective gate control list, each gate controller configured to:
determine if the first and last entries of the respective gate control list are in the same state;
in response to determining that the respective gate control list are in the same state, add a time from the first entry to a time for the last entry;
in response to determining that the respective gate control list are not in the same state, not add a time from the first entry to a time for the last entry; and
if there are remaining gate controllers, move on to the next gate controller.

2. The network device of claim 1, wherein an entry in the sequence of entries includes a control field which indicates end of list.

3. The network device of claim 1, further comprising configuration data associated with each gate control list.

4. The network device of claim 1, wherein each gate controller is configured, in a first cycle, to read each entry in the sequence of entries starting from an initial entry and, in a second, subsequent cycle, to ready entries in the sequence starting from an entry which follows the initial entry.

5. The network device of claim 1, further comprising:
a data handler for allocating data to the set of queues.

6. The network device of claim 1, further comprising:
a media access controller.

7. The network device of claim 1, wherein the network device is an Ethernet controller.

8. The network device of claim 1, which is implemented in hardware.

9. A monolithic integrated circuit comprising:
the network device of claim 1.

10. The monolithic integrated circuit of claim 9, further comprising:
at least one central processing unit.

11. The monolithic integrated circuit of claim 9, further comprising:
random-access memory.

12. The monolithic integrated circuit of claim 9, further comprising:
a routing engine.

13. The monolithic integrated circuit of, claim 9 further comprising:
a physical interface transceiver.

14. An end station comprising the network device of claim 1.

15. A switch comprising the network device of claim 1.

16. A network comprising:
a bus system;
at least one network device of claim 1 connected to the bus system.

17. A motor vehicle comprising at least one network device of claim 1.

18. A method for controlling the network device according to claim 1, the method comprising, altering, by each gate controller, the state of the gate in response to reading the entry without the entry specifying the state of the gate,
wherein the altering the state of the gate comprises:
changing an open gate state to a closed gate state, or
changing a closed gate state to an open gate state.

19. The network device of claim 1, wherein each gate controller is configured to read an individual gate control list, to generate a gate control signal and to issue the gate control signal to a respective gate.

20. The network device of claim 1, wherein each gate controller is configured to read an entry in the gate control list and to toggle the state of the gate in response to reading the entry without the entry specifying the state of the gate.

21. A method of generating two or more gate control lists, for each gate control list, the method comprising:
receiving data describing operation of a set of two or more gates;
converting the data into a set of two or more gate control lists, each gate control list configured to control a respective single gate;
writing the set of two or more gate control lists into memory or set of registers for each gate control list;
determining if a respective gate is in the same state for first and last entries;
in response to determining that the respective gate control list are in the same state, adding a time from the first entry to a time for the last entry;
in response to determining that the respective gate control list are not in the same state, not adding a time from the first entry to a time for the last entry; and
if there are remaining gate control lists, moving to the next gate control list.

22. A non-transitory computer program producing storing a computer program which, when executed by a processor, causes the processor to perform the method of claim 21.

23. A method of time-aware shaping, the method comprising:
reading an entry from a gate control list configured to control a single gate for a respective single gate, the gate control list being generated according to claim 21;
generating a gate control signal; and
issuing the gate control signal to the gate.

24. A method of claim 23, which is implemented in hardware logic.

* * * * *